Patented Aug. 14, 1945

2,382,565

UNITED STATES PATENT OFFICE 2,382,565

RECOVERY OF MATERIAL FROM ROASTER GASES

Carl W. J. Hedberg, Bound Brook, N. J., and Harry L. Richardson, St. Louis, Mo., assignors to Research Corporation, New York, N. Y., a corporation of New York No Drawing. Application November 1, 1943, Serial No. 508,622

7 Claims. (Cl. 75—9)

This invention relates to a method for recovering suspended material from roaster gases and particularly to an improved method for the electrical precipitation of suspended material contained in gases from the flash roasting of ores.

The removal of suspended material from gases from the flash roasting of ores, such as zinc sulphide ores, by precipitation in electrical precipitators of the Cottrell type has entailed considerable difficulties. Electrical operation of the precipitators has been erratic and characterized by frequent periods of excessive arcing, and efficiencies of precipitation have been encountered ranging from below 95% to as low as 75%. Both the low efficiencies and the non-uniformity of electrical operation are troublesome and undesirable.

It has been found that much higher efficiencies of precipitation and much more uniform operation of the electrical precipitators can be obtained by carrying out the flash roasting operation in the presence of a relatively small quantity of a metal chloride, preferably a chloride which volatilizes or dissociates at or below the highest temperature of the roasting operation, for example, sodium chloride, magnesium chloride, or ferric chloride. The dust deposits on the discharge electrodes are less extensive and tenacious and are more easily removed by mechanical means.

For example, by adding about 2.5 pounds of sodium chloride per ton of ore to a zinc sulphide ore being fed to a flash roaster, the efficiency of collection of suspended particles from the roaster gases by electrical precipitation has been increased from 70 to 75% to over 97% with greatly improved uniformity of electrical operation of the precipitator.

In general, from 1 to 10 pounds of chloride per ton of ore have been found to be effective, although the improvement obtained by increasing the amount over about 2.5 pounds per ton is usually relatively slight.

The salt may be added to the ore at any point prior to or at its introduction into the flash roaster or it may be added to the air stream supplied to the burner of the roaster. It may be added dry or in solution.

Before being subjected to electrical precipitation, the gases may be cooled or humidified or otherwise pretreated, and they are preferably passed through settling chambers or other mechanical separators, such as cyclones, to remove the coarse suspended particles.

We claim:

1. The method of recovering suspended materials from gases from the flash roasting of sulphide ores which comprises flash roasting the ores in the presence of a metal chloride which dissociates below the highest temperature of the roasting operation, and subjecting the gases from the roasting operation to electrical precipitation.

2. The method of recovering suspended materials from gases from the flash roasting of sulphide ores which comprises flash roasting the ores in the presence of a metal chloride which dissociates below the highest temperature of the roasting operation in an amount of from 1 to 10 pounds per ton of ore, and subjecting the gases from the roasting operation to electrical precipitation.

3. The method of recovering suspended materials from gases from the flash roasting of sulphide ores which comprises flash roasting the ores in the presence of sodium chloride, and subjecting the gases from the roasting operation to electrical precipitation.

4. The method of recovering suspended materials from gases from the flash roasting of sulphide ores which comprises flash roasting the ores in the presence of sodium chloride in an amount of from 1 to 10 pounds per ton of ore, and subjecting the gases from the roasting operation to electrical precipitation.

5. The method of recovering suspended materials from gases from the flash roasting of sulphide ores which comprises flash roasting the ores in the presence of sodium chloride in an amount of about 2.5 pounds per ton of ore, and subjecting the gases from the roasting operation to electrical precipitation.

6. The method of recovering suspended materials from gases from the flash roasting of zinc sulphide ores which comprises supplying sodium chloride to the roasting operation, and subjecting the gases from the roasting operation to electrical precipitation.

7. The method of recovering suspended materials from gases from the flash roasting of zinc sulphide ores which comprises supplying sodium chloride to the roasting operation in an amount of about 2.5 pounds per ton of ore, and subjecting the gases from the roasting operation to electrical precipitation.

CARL W. J. HEDBERG.
HARRY L. RICHARDSON.